UNITED STATES PATENT OFFICE.

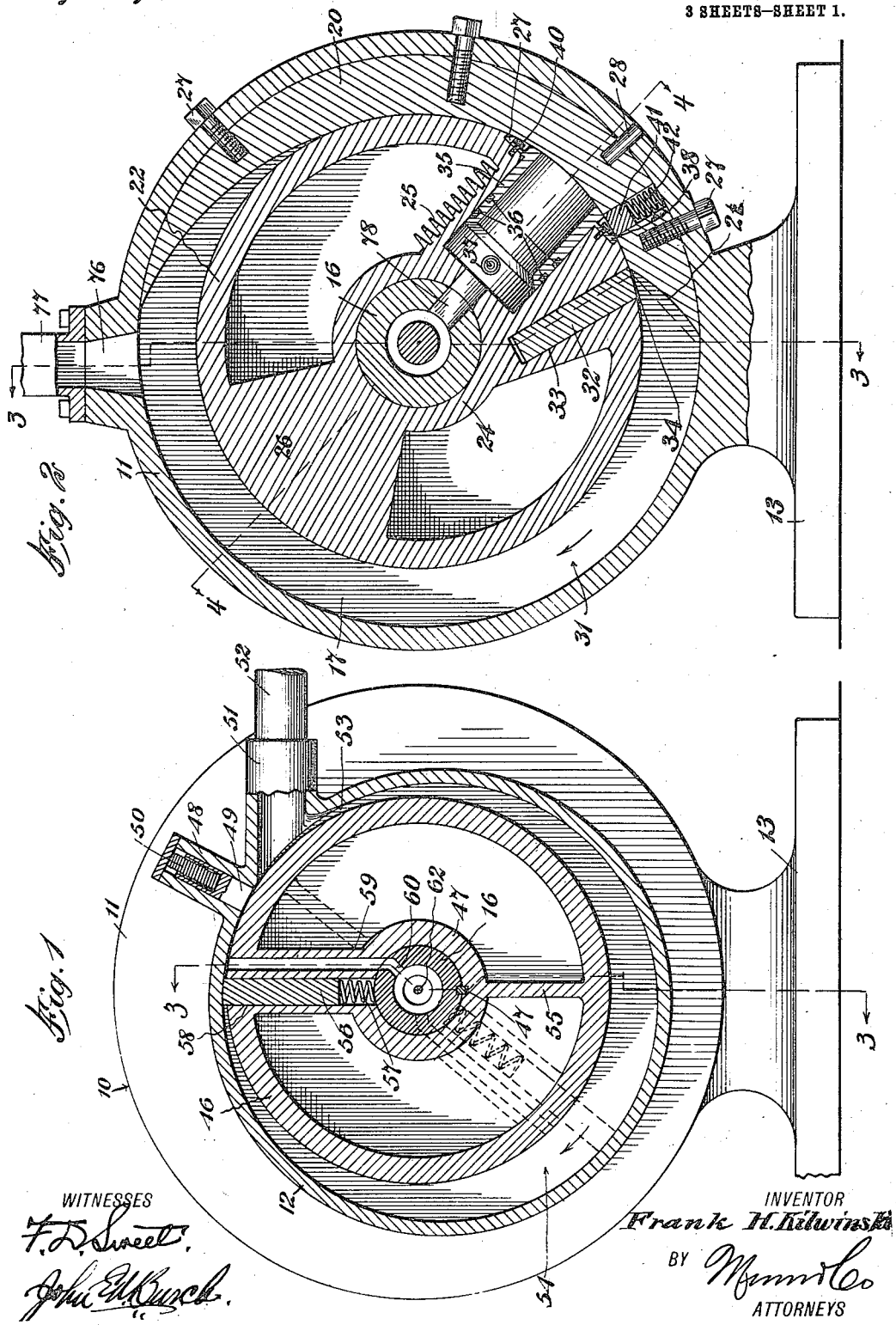

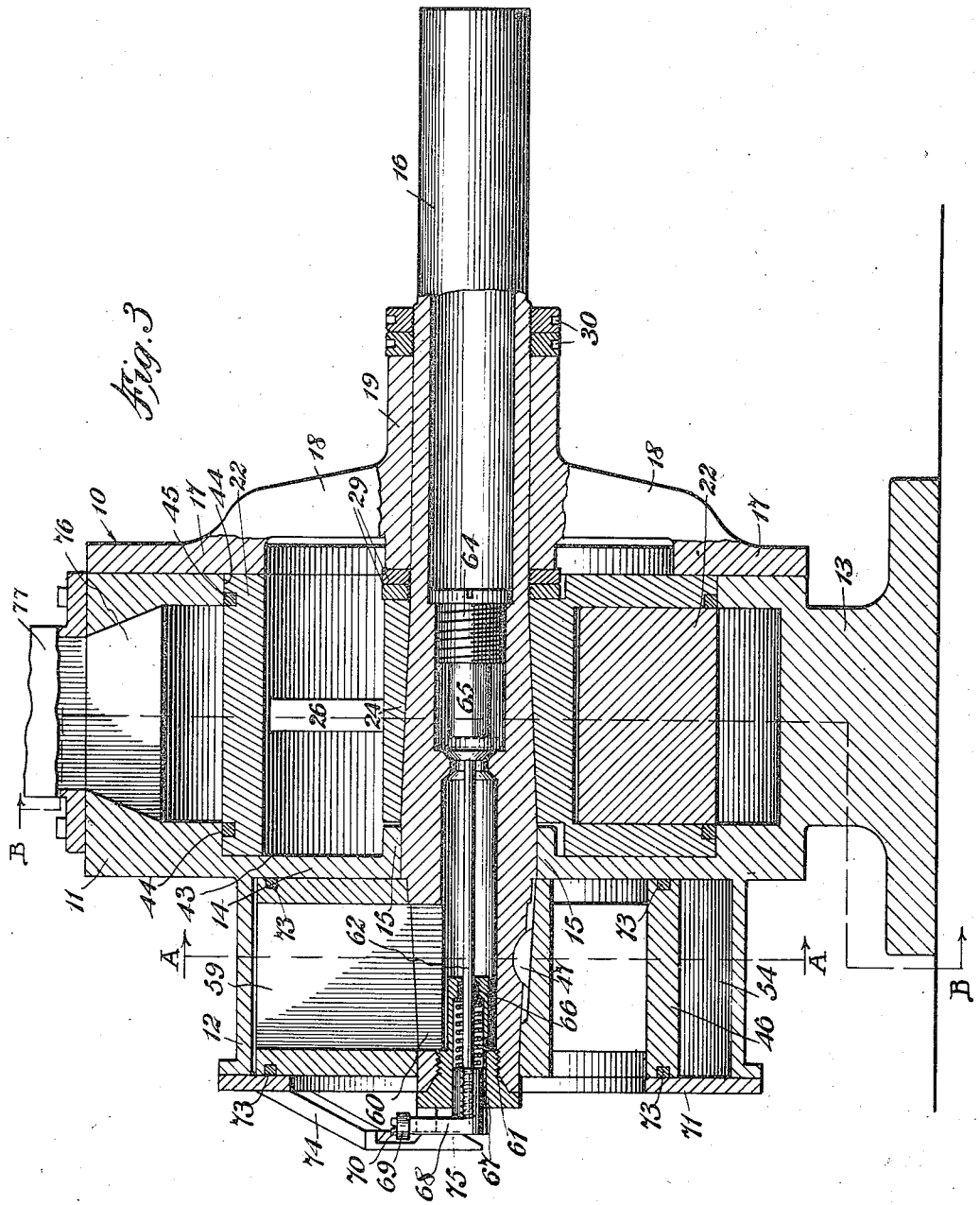

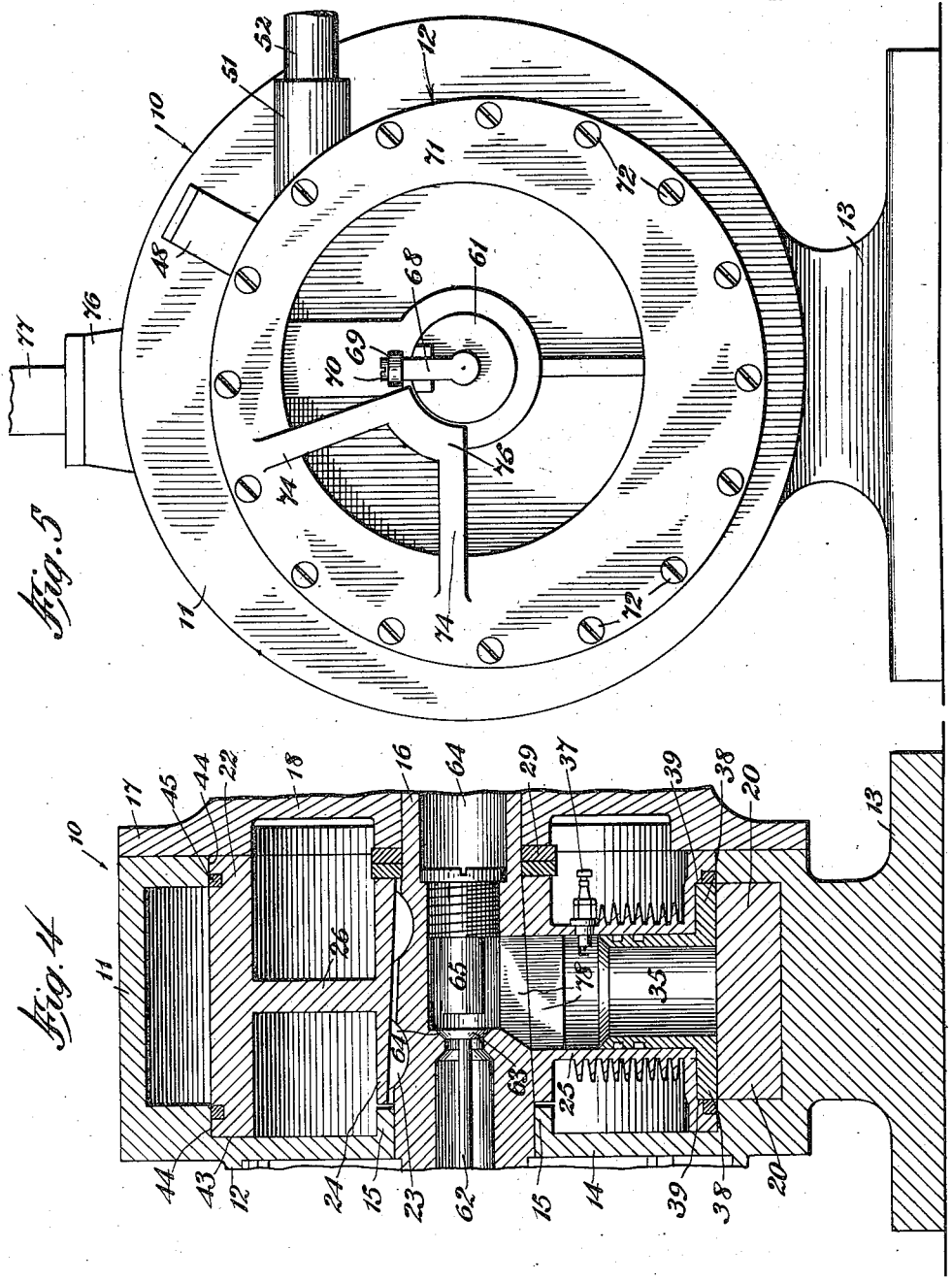

FRANK HERMAN KILWINSKI, OF SAN FRANCISCO, CALIFORNIA, ASSIGNOR OF ONE-HALF TO WILLIAM HEUSSER, OF SAN FRANCISCO, CALIFORNIA.

ROTARY INTERNAL-COMBUSTION ENGINE.

1,134,869.     Specification of Letters Patent.     Patented Apr. 6, 1915.

Application filed May 8, 1914. Serial No. 837,186.

*To all whom it may concern:*

Be it known that I, FRANK H. KILWINSKI, a citizen of the United States, and a resident of San Francisco, in the county of San Francisco and State of California, have invented a new and Improved Rotary Internal-Combustion Engine, of which the following is a full, clear, and exact description.

This invention relates to improvements in rotary motors and more particularly to an improved rotary internal combustion motor or engine, which has for its object the provision of a device which simplifies the structure of engines and reduces the number of parts to a minimum, and in which greater efficiency is obtained by the omission of complicated working parts resulting in lost motion and necessitating their frequent repairs.

Another object of the invention is to provide an improved rotary internal combustion motor which embodies a main and an auxiliary casing each having a rotary piston operating therein in such a manner as to automatically supply fuel to the auxiliary cylinder in which it is compressed and from which it is automatically discharged into a combustion chamber of the rotor of the main engine casing and exploded to impart rotation to the rotor, power being derived from the shaft of the rotor in such a manner as to permit the convenient transmission of power without the necessity of employing complicated transmission devices or gearings.

A still further object of the invention is to provide a rotary internal combustion engine having main and auxiliary casings with rotors having pistons positioned in such a manner as to provide for the complete supply and compression of the combustible gases and ejection thereof into a combustion chamber carried by the rotor of the main casing while the latter is moving against an abutment fixed within the main casing or stator in such a manner as to prevent the possible escape of such compressed gases whereby when the latter are ignited and combustion ensues rotation will be imparted to the rotor, assisted by a sliding blade or piston carried by the rotor. The construction and relative positions of the parts are such that by reason of a one-way motion an increased stroke length is provided for, thus allowing greater expansion of the exploded gases in driving the rotor and avoiding unnecessary vibration and lost motion.

With the above and other objects in view, the invention resides in the peculiar combination and arrangement of parts to be hereinafter more fully described, illustrated and claimed, it being also an object to provide a device which is simple in construction, durable and efficient in operation and not likely to get out of working order.

Reference is to be had to the accompanying drawings forming a part of this specification, in which similar characters of reference indicate corresponding parts in all the views, and in which—

Figure 1 is a vertical sectional view of my rotary internal combustion engine taken on the line A—A of Fig. 3 vertically through the auxiliary casing of the stator and looking in the direction indicated by the arrows; Fig. 2 is a sectional view taken on the line B—B of Fig. 3 and also looking in the direction indicated by the arrow; Fig. 3 is a vertical longitudinal sectional view through the entire device taken on the lines 3—3 of Figs. 1 and 2; Fig. 4 is a sectional view taken on the line 4—4 of Fig. 2; and Fig. 5 is a side elevation of the improved engine showing the intake valve operating means.

As illustrated, the engine comprises a stator 10 consisting of a main casing 11 and an auxiliary casing 12 preferably integral therewith, as shown in Fig. 3 of the drawings, or cast in one, of the proper materials. It will be observed that the casings forming the stator comprise cylindrical or drum-like shells with the auxiliary casing of smaller diameter than the diameter of the main casing, which latter is supported upon a base 13. The main casing 10 has an intermediate wall 14 flanged as shown at 15 to provide a bearing for the engine shaft 16 and the opposite side of the casing is closed by a detachable plate 17 suitably secured thereto by bolts or other preferred fastening means. This plate 17 is pi vided with a plurality of outwardly branching arms 18 terminating in a bearing sleeve 19 in which the shaft is also rotatable in such a manner as to form with the flanged wall 14, a two-point bearing for the shaft which may be provided with suitable anti-friction means to allow the shaft to rotate without undue friction.

Secured to one side of the main casing at the inner face thereof is an abutment 20, the same consisting of a casting or wear-plate extending from a point near the top of the casing at one side to a point near the bottom of the casing at the same side and gradually increasing in thickness from its upper end to its lower end, thus to provide an interior cam having its lower end curved as shown at 21 but disposed on a line substantially tangentially to the interior wall of the casing to form a resisting face against which pressure produced by the explosive discharges operate or are deflected in such a manner as to drive the rotor.

The rotor is indicated by the numeral 22 and is keyed to the hollow motor shaft 16 as shown at 23 concentrically journaled in the stator or casings in such a manner as to bring a portion of the circumferential face of the rotor adjacent to the thickest part of the abutment or cam 20 in contact with the inner face of the latter to prevent the escape of compressed or exploded gases there-between. This rotor comprises a cylindrical shell having a bearing sleeve 24 engaged upon a tapered portion of the shaft and keyed to the latter as heretofore described, while at one side of the sleeve is a combustion chamber 25 preferably fluted, as shown, to provide for the radiation of heat and cooling of the chamber in the usual manner. The diametrically opposite portion of the rotor is provided with a web 26 which, with the combustion chamber, forms a connection between the bearing sleeve and the shell of the rotor. This web portion also provides a counterbalance for the rotor to overcome the weight of the combustion chamber in such a manner as to prevent lost motion, the making of the rotor in the form of a shell of the desired weight being for the purpose of rendering the structure as light as possible consistent with strength and durability.

As illustrated, the abutment 20 is secured against the inner wall of the main casing by fastening screws 27, a dowel pin 28 engaged through the casing and into the abutment serving to temporarily retain the abutment in position and to cause the threaded apertures thereof to aline with the apertures in the casing while the screws are being inserted and tightened. In order to hold the rotor keyed to the shaft 16 and against displacement on the tapered portion, a pair of lock nuts 29 are engaged on the shaft beyond the end of the bearing sleeve 24 opposite to the flange 15 and between said end and the sleeve 19, thus eliminating end thrust. A pair of lock nuts 30 are also mounted on the shaft 16 outwardly of the sleeve 19, and together with the lock nuts 29, prevent the shaft from shifting longitudinally in either direction.

As the rotor 22 is of smaller diameter than the interior diameter of the main casing, an interior channel 31 is formed between its periphery and the inner face of the casing, which latter is adapted to be contacted by a sliding piston 32 mounted in a slot 33 in the web portion of the rotor adjacent to the combustion chamber 25 and the beveled engaging end 34 of said piston engages the abutment and inner face of the casing while the blade moves outward by centrifugal force. Slidably mounted in the combustion chamber 25 is a sleeve 35 carrying suitable packing rings 36 to form a tight joint between its peripheral wall and the inner face of the chamber. This sleeve terminates short of the end wall of the chamber and is preferably beveled, as shown in Fig. 2 of the drawings, so as to be disposed in juxtaposition to a spark plug 37 or other igniting device. The purpose of movably mounting the sleeve in the combustion chamber is to permit the sleeve to act as a packing device between the rotor and the abutment, the sleeve being adapted to automatically shape itself to the interior of the abutment to perfectly seat thereagainst and prevent the escape of gas from the combustion chamber while the same is being compressed therein. For this purpose the sleeve is provided with a flange 38 extending into a recess 39 in the rotor at the mouth of the combustion chamber through which fastening devices 40 are engaged to allow limited movement of the sleeve thereon. This object is further attained by a packing 41 mounted in a recess in the abutment 20 near its lower end and normally held inward to contact with the rotor by an expansible spring 42, it being understood that said packing and the flange of the combustion chamber sleeve extend continuously of the transverse dimension of the casing or abutment in order to close the space between said parts. The main casing of the rotor is enlarged at its interior portion, as shown at 43, to form annular shoulders 44 for contact by the peripheral wall of the rotor, and said wall is provided with packing or snap rings 45 contacting with said shoulders to prevent the escape of the compressed gases between the rotor and the casing and at the same time to allow the rotor free rotation in the casing and thickening of the walls of the casing adjacent to the interior channel 31 to withstand the shocks incident to the escape of the explosive gases under pressure therein.

The auxiliary casing 12 forms part of a gas compressor which includes a rotor 46 which is fixed or keyed to the shaft 16, as shown at 47, and which is disposed or mounted eccentrically relative to the auxiliary casing due to the eccentric formation of the auxiliary casing with the main casing. In this manner the rotary piston of the gas compressor is disposed to contact with the inner face of the auxiliary casing near its upper portion at one side where it is provided with a transverse extension 48 having an abutment or abutment plate 49 slidably mounted therein and held in contact with the peripheral surface of the piston as by means of an expansible spring 50 positioned between the end wall of the extension and the abutment plate. A gas inlet or intake extension 51 is cast integral with the auxiliary casing and branches horizontally therefrom beneath the extension 48 so as to be connected with any suitable supply pipe 52 leading from a carbureter or other source of gas supply, there being a narrow passage 53 between the rotor and the inner face of the casing immediately beneath the intake which gradually increases in width toward the bottom to provide a chamber 54 in which the gas is compressed, such chamber gradually narrowing toward the top or point of contact of the rotor with the abutment plate. The rotor is provided with a diametrical spider 55 in one side of which a piston 56 is slidably mounted and normally forced outward by a coiled spring 57, the piston being mounted in a recess 58 in the spider and positioned between the inner end of the spider and the end wall of the recess. Adjacent to the piston 56 but separated therefrom is a transverse and substantially radially extending passage 59 which communicates through the peripheral wall of the rotor with the chamber 54 and which also communicates with the bore of the hollow shaft 16, as shown at 60.

Fixed in the end of the shaft 16 adjacent to the auxiliary casing is a valve stem guide 61 in which the stem 62 of a valve 63 is slidably mounted and through which it extends, said valve being adapted to engage an internal annular seat 64 in the bore of the shaft so as to unseat inwardly, as shown in dotted lines in Fig. 3, but being limited in such movement by a plug 64 threaded in the bore of the shaft and having a reduced extension 65 with which the valve contacts. The stem operates through the guide which carries a packing 66 near its inner end around the stem and mounted in the stem guide around the stem is an expansible coiled spring 67 which forces outward on the enlarged portion of a valve lever 68 to normally hold the valve 63 seated or closed. The valve lever 68 is in the form of an angular member having an enlarged portion slidable in the valve stem guide and rigidly connected to or formed integral with the stem, while the outer end of the lever carries a roller 69 with its stub shaft or pivot in the form of a screw 70 to permit the roller to be replaced when worn, positioned at right angles to the axis of the machine. The adjacent end of the auxiliary casing carries a plate 71 which serves to close the chamber 54, the same being removably secured in position by screws 72 so as to permit convenient removal thereof for purposes of inspection and repair. The rotating parts are made of such material and preferably cast strong enough to overcome centrifugal force, the construction thus being simplified by reason of the particular mounting of the shaft, the absence of crank shafts, fly wheels, reciprocating pistons, connecting rods and the employment of only one valve instead of a multiple of valves as generally employed. To form a tight joint between the rotor 46 at the sides of the latter and the walls or plates 41 and 71, packing or snap rings 73 are engaged in circular grooves in the side walls of said rotor and communicating with the outer faces thereof in such a manner as to prevent the escape of the compressed gases between said parts. The plate or wall 71 is provided with spaced radially extending arms 74 bearing a cam 75 which forms a connection between their inner ends and which is disposed in the path of the roller 69 in order to repress the valve stem against the action of the spring 67 for the purpose of unseating the valve 63 and permitting the return of said valve to an unseated position during the rotation of the shaft and piston, while the cam is stationary with the casing. The exhaust of the motor is indicated by the numeral 76 and is preferably formed by an integral extension of the main casing provided for the attachment of an exhaust pipe 77.

The operation of the device is as follows:—The engine is rotated or turned over one revolution which causes a suction from the carbureter through the intake 51 until the full supply or charge of gas in the chamber 54 is effected, the parts having been rotated a complete revolution from the position shown in Figs. 1 and 2 of the drawings and the pistons 32 and 56 moving outward by centrifugal force and its spring, respectively, to contact with the inner faces of the main and auxiliary casings, respectively. After a charge is thus effected the engine is again turned over another revolution in such a manner as to permit and cause the piston 56 to move outward, as indicated in the dotted line position in Fig. 1 of the drawings, and thereby intercept the chamber 54 to compress the gases between it and the abutment plate 49, this action also creating a suction on the carbureter behind the piston 56 in such a manner as to draw in a new supply of gas through the intake 51.

The gas compressed in front of the piston 56 is compressed at a greater degree as the piston approaches the position shown in solid lines in Fig. 1 of the drawings, the rotary piston of the gas compressor having a slight clearance from the casing adjacent to the abutment plate 49. These compressed gases will thus be forced through the passage 59 into the hollow shaft 16 and together with the actuation of the valve by means of the cam, will operate to unseat the valve and permit the escape of the compressed gas into the combustion chamber 25. The spring tending to normally seat the valve is of sufficient tension to keep the valve closed for substantially the first three-fifths of the revolution of the piston of the compressor, and then as the valve is unseated the gas escapes under considerable force through alined radial passages 78 through the shaft and shell of the combustion chamber or cylinder into the combustion chamber, the rotor being in the position shown in Fig. 2 of the drawings, and the sleeve of the combustion chamber forming an air-tight connection between the rotor and the abutment 20 to prevent the escape of the compressed gas.

When the piston 56 substantially approaches the position shown in Fig. 1, the valve lever 68 will be so positioned with respect to the stationary cam as to allow the seating of the valve, the cam at this time being out of the path of the roller which it engages and in an instant of time, through operation of the ignition system, the compressed gas in the combustion chamber is ignited while the chamber is disposed adjacent to the portion 21 of the abutment. At this time the sliding piston 32 will be held outward by centrifugal force and the spring in contact with the inner surface of the main casing, and form with the blade guide a restricted space or chamber which will cause the force of the explosion or pressure of the burned gases in back of the piston 32 to impart rotation to the rotor, and as soon as the piston has passed the exhaust port 76, exhaust gases will escape to relieve the pressure therein and this same action will continue as the parts continue to rotate in unison.

Having thus described my invention, what I claim as new and desire to secure by Letters Patent is:—

1. In a rotary motor, a cylindrical casing having an exhaust at the top, a rotor journaled in the casing and having a closed space at one side of the casing and an internal channel in the remaining portion, a combustion chamber in said piston, a sliding piston in front of the chamber and carried by the rotor to move outward in contact with the inner surface of the casing, means for supplying combustible gases to said chamber, means for igniting the same to exert force against the piston for imparting rotation to the rotor, said gases escaping through the exhaust at the top, and a sleeve in the combustion chamber movable outward to form an air-tight joint between the rotor and the contacting part of the casing.

2. A rotary engine embodying a stator including a main casing, a rotor journaled in said casing, a hollow shaft disposed axially to the casing and rotatably journaled to support the piston for rotation therewith, an exhaust port for the casing, an abutment at one side of the casing for contact with the rotor at a portion of the latter, said abutment gradually increasing in thickness toward one end, an integral auxiliary casing at one side of the main casing and of reduced diameter relative to the latter, a rotor also fixed to the shaft and journaled in the auxiliary casing eccentrically relative to the same, said latter rotor having a radial passage communicating with the hollow shaft, sliding pistons carried by the rotors to engage the inner faces of the respective casings, an intake for said auxiliary casing, a valve longitudinally mounted in the shaft and normally seated to resist gases compressed in the auxiliary casing between the rotor thereof and casing and in front of the piston carried by the rotor last named, and means for unseating the valve at a predetermined time to discharge the gases thus compressed through the shaft and into the combustion chamber for explosion behind the piston of the main rotor of the main casing.

3. The combination with a casing and a rotor rotatably journaled therein and of reduced diameter relative thereto to provide a surrounding channel of means for intercepting the channel between the casing and rotor, an exhaust for the casing, an auxiliary casing eccentrically disposed relative to the first mentioned casing, a rotor journaled in the auxiliary casing concentrically relative to the first mentioned casing and rotor whereby an internal chamber tapering toward its ends is provided in the auxiliary casing, a sliding piston carried by the second-named rotor and adapted upon rotation of the latter to draw fluid supply into the chamber therebehind, an axial member having a passage leading from the second named rotor to the first-named rotor and having an internal seat, a valve coöperating with said seat and opening in the direction of the first-named rotor, spring means normally seating said valve, a cam at one end of the auxiliary casing, and an angular extension on the valve stem to contact with the cam for unseating the valve and supplying said fluid under pressure for driving the rotors.

4. A rotary internal combustion motor, the combination with a main casing, a shaft journaled in the casing and a rotor carried thereby to rotate therewith; of an auxiliary casing at one side of the main casing, a rotatable gas compressor in the auxiliary casing, a combustion chamber in the rotor and communicating with the gas compressor through said shaft, means in said chamber to form an air tight union with the interior of the casing, a normally seated valve controlling the supply of compressed gas to the combustion chamber, coöperative means carried by the valve and one casing for positively unseating the valve harmoniously with the compression of the gas in the auxiliary casing and a gas intake for the compressor, in which latter the gas is compressed and discharged into the combustion chamber to rotate the latter upon being ignited.

5. In a rotary internal combustion motor, the combustion with a main casing, a shaft journaled in the casing and a rotor carried thereby to rotate therewith; of an auxiliary casing at one side of the main casing, a rotatable gas compressor in the auxiliary casing, a combustion chamber in the rotor and communicating with the gas compressor through said shaft, means movably mounted in the combustion chamber to contact with the interior of the main casing during the interval of rotation of the rotor therein to form an air tight union with the interior of the casing, a normally seated valve controlling the supply of compressed gas to the combustion chamber, coöperative means carried by the valve and auxiliary casing for positively unseating the valve independent of the gas pressure and a gas intake for the compressor, in which latter the gas is compressed and discharged into the combustion chamber to rotate the latter upon being ignited.

6. In a rotary internal combustion engine, a stator including a main casing suitably supported, a rotor concentrically journaled therein and having a combustion chamber, a sleeve movably mounted in said chamber and adapted to move outward to contact with the interior of the casing at a predetermined point to prevent the escape of the compressed gas therefrom just prior to the ignition thereof, an abutment in the casing comprising an independent plate tapered toward its ends and secured therein and against which pressures produced by the explosion of gases in the chamber act to drive the rotor, an auxiliary casing extension at one side of the main casing, a rotor eccentrically journaled therein to rotate in unison with the rotor in the main casing, an intake for the auxiliary casing, said second-named rotor being adapted to cause a suction in the auxiliary casing to draw a supply of gas therein and compress the same upon the succeeding revolution thereof, an exhaust for the main casing and a valve communication between the auxiliary casing and rotor thereof for supplying gas under pressure to the combustion chamber of the first-named rotor in which the same is ignited.

7. In a rotary internal combustion engine, a stator including a main casing suitably supported, a rotor journaled therein and having a combustion chamber, an abutment in the casing comprising an independent plate secured therein and against which pressures produced by the explosion of gases in the chamber act to drive the rotor, a sleeve slidably mounted in said chamber and adapted to move outward to contact with the interior face of the abutment during the rotation of the rotor to prevent the escape of compressed gas from the combustion chamber until the same has passed beyond the abutment plate, an auxiliary casing extension at one side of the main casing, a rotor eccentrically journaled therein to rotate in unison with the rotor in the main casing, an intake for the auxiliary casing, said second-named rotor being adapted to cause a suction in the auxiliary casing to draw a supply of gas therein and compress the same upon the succeeding revolution thereof, an exhaust for the main casing, a hollow shaft rotatably supporting the rotors in the casings, a normally seated valve axially mounted in the hollow shaft for controlling the supply of gas under pressure to the combustion chamber, means in the shaft for regulating the unseating of the valve and means cooperative with the outer end of the valve for unseating the same at each revolution of the shaft.

8. In a rotary motor, a cylindrical casing open at one side and having an exhaust at the top, a rotor journaled in the casing and having a closed space at one side of the casing and an internal channel in the remaining portion, said rotor comprising a shell partly open at the open side of the casing, a cylinder having a combustion chamber in said rotor said cylinder communicating with the atmosphere at the open side of the casing, a sliding piston in front of the combustion chamber and carried by the rotor to move outward in contact with the inner surface of the casing adjacent the internal channel, means for supplying combustible gases positively at predetermined intervals to said chamber in rear of said piston and means for igniting the same between one end of the closed space and the pistons, whereby the pressures produced will act on the piston for imparting rotation to the rotor, said gases when spent escaping through the exhaust at the top as the piston approaches the other end of the closed space.

9. In a rotary internal combustion motor, a stator including a main casing suitably supported and an auxiliary casing formed therewith, said main casing having a dividing wall between it and the auxiliary casing and having its opposite side open, said main casing also having an interior enlargement producing shoulders, a hollow shaft journaled in the casing, a rotor fixed to the shaft and rotatable in the main casing in contact with the enlargement, means to prevent end thrust of the shaft, said rotor having a combustion chamber communicating with the hollow portion of the shaft and being adapted to contact with the interior wall of the main casing during a portion of its rotation, means for forming an airtight connection between the rotor and casing, means carried by the rotor to intercept the space between it and the casing during the remaining portion of the rotation thereof, a rotor fixed to the shaft and operating in the auxiliary casing to rotate in contact with the casing during a portion of its rotation, a fuel inlet for the auxiliary casing, means to form an airtight connection between the rotor and auxiliary casing, means carried by the rotor of the auxiliary casing to intercept the space between the two to draw the supply into the casing therebehind and compress the same upon the succeeding revolution of the rotor, communication being established through the rotor between the interior of the auxiliary casing and the hollow shaft and externally operated means mounted in the hollow shaft for controlling the supply of the compressed fuel to the combustion chamber for ignition.

10. In a rotary internal combustion motor, a stator including a main casing suitably supported and an auxiliary casing formed therewith, said main casing having a dividing wall between it and the auxiliary casing and having its opposite side open, said main casing also having an interior enlargement producing shoulders, a hollow shaft journaled in the casing, a rotor fixed to the shaft and rotatable in the main casing in contact with the enlargement, means to prevent end thrust of the shaft, said rotor having a combustion chamber communicating with the hollow portion of the shaft and being adapted to contact with the interior wall of the main casing during a portion of its rotation, means for forming an airtight connection between the rotor and casing, means carried by the rotor to intercept the space between it and the casing during the remaining portion of the rotation thereof, a rotor fixed to the shaft and operating in the auxiliary casing to rotate in contact with the casing during a portion of its rotation, a fuel inlet for the auxiliary casing, means to form an airtight connection between the rotor and auxiliary casing, means carried by the rotor of the auxiliary casing to intercept the space between the two to draw the supply into the casing therebehind and compress the same upon the succeeding revolution of the rotor, communication being established through the rotor between the interior of the auxiliary casing and the hollow shaft, a plug in the hollow shaft and having a stem, said shaft being formed with an interior seat, a bearing at one end of the shaft, a valve coöperating with said seat and slidable through the bearing, a spring carried by the bearing, a removable angular member at one end of the stem for contact by the spring whereby outward pressure is exerted there-against to normally seat the valve and a cam carried by the auxiliary casing and overlying the angular member to actuate the same for unseating the valve to permit the escape of compressed fuel into the combustion chamber for ignition behind the intercepting means thereof.

In testimony whereof I have signed my name to this specification in the presence of two subscribing witnesses.

FRANK HERMAN KILWINSKI.

Witnesses:
W. R. SCOFIELD,
T. O'DONNELL.